No. 771,638. PATENTED OCT. 4, 1904.
H., J. W. & B. HORNBY.
FRUIT RENOVATOR.
APPLICATION FILED DEC. 1, 1902.
NO MODEL.

Witnesses:
J. I. McDonald
Jas. M. Mayer

Inventors.
Henry Hornby
John W. Hornby
Bert Hornby
By Howard M. Cox Atty

No. 771,638. Patented October 4, 1904.

UNITED STATES PATENT OFFICE.

HENRY HORNBY, JOHN W. HORNBY, AND BERT HORNBY, OF EGAN, SOUTH DAKOTA.

FRUIT-RENOVATOR.

SPECIFICATION forming part of Letters Patent No. 771,638, dated October 4, 1904.

Application filed December 1, 1902. Serial No. 133,523. (No model.)

*To all whom it may concern:*

Be it known that we, HENRY HORNBY, JOHN W. HORNBY, and BERT HORNBY, citizens of the United States, residing in the city of Egan, county of Moody, in the State of South Dakota, have invented certain new and useful Improvements in Fruit-Renovators, of which the following is a specification.

Our invention relates to devices for the renovation of dried fruit and similar products; and its object is to provide a device which in operating will refresh and renovate fruit and similar products.

To this end it consists, among other things, in the features of construction and combination hereinafter more fully described, and pointed out in the claim hereto annexed.

Figure 1:
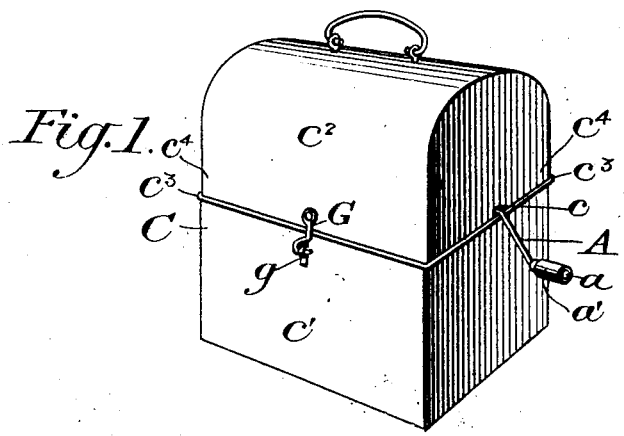
Figure 2:
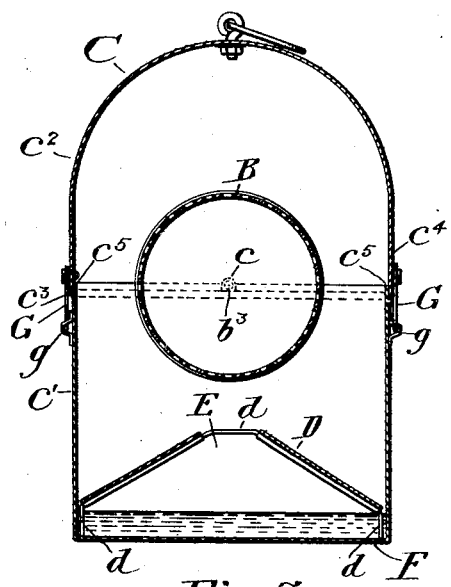
Figure 5:
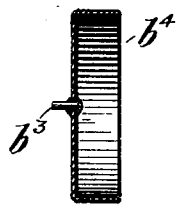
Figure 3:
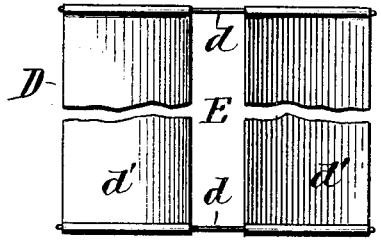
Figure 4:
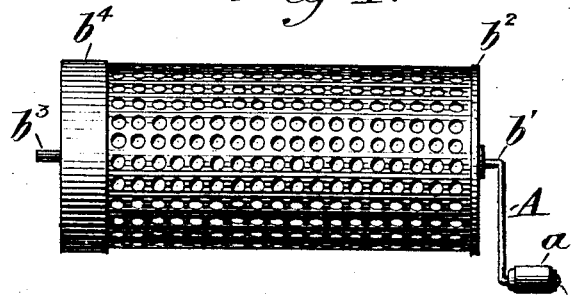

Referring to the accompanying drawings, which illustrate one form of device and certain of the parts thereof wherein the principle of our invention is embodied, and in which drawings like reference-letters indicate the same or corresponding parts, Figure 1 is a perspective view. Fig. 2 is a vertical cross-section. Fig. 3 is a broken plan view. Fig. 4 is a side elevation of the cylinder, and Fig. 5 is a sectional view of the cylinder-cap.

Dried fruit and similarly-prepared articles deteriorate upon exposure to the atmosphere. If this exposure be of sufficient length, they may become practically both unsalable and unusable, owing to excessive evaporation of such liquid matter as may have remained in them after their preparation for the market or for purposes of preservation and owing also to dirt and dust which may accumulate upon them. By employing the device and method of our invention dried fruit which has thus deteriorated may be restored to substantially the condition it was reduced to by the original process of drying.

Referring to the drawings, A is a crank, the arm $a$ of which preferably has a handgrip $a'$ revolubly mounted thereupon; B, a perforated or foraminated cylinder; $b'$, a combined cylinder-journal and crank-shaft, secured at one of its ends to the crank A and preferably forming a part or continuation thereof and at its other end secured to the cylinder-head $b^2$; $b^3$, a journal secured to or forming a part of the cylinder head or cap $b^4$; C, a receptacle (formed of any suitable material or materials) provided with any suitable journal-receiving means, as the slots $c$, which are adapted to receive the journals $b'\ b^3$ of the cylinder B, and comprising a base or liquid-receiving portion $c'$ and an upper portion or cover $c^2$, which portions may be hinged or removably secured to each other; D, a steam-directing member comprising (in the form thereof shown in Figs. 2 and 3 of the drawings) the bent wires $d$ and convergently-inclined strips or members $d'$ secured thereto; E, a passage between the wires $d$ and strips $d'$; F, water or other suitable volatile liquid.

Assuming that the parts described are in their respective normal positions, substantially as shown in Figs. 1 and 2 conjointly, that the liquid F by proper application of heat thereto is being converted into steam, and that the cylinder B is partially filled with dried fruit or other product to be renovated, the operation of our device as a whole is as follows: If the crank A be turned, the fruit-containing cylinder B will be revolved upon its journals $b'\ b^3$, when steam arising from the liquid F will pass through the passage E, (being directed therethrough by the deflecting-plates $d'$,) come into substantially immediate contact with that portion of the wall of the revolving cylinder immediately overlying said passage, and be communicated by means of the perforations to the dried fruit or parts thereof within the cylinder. The action of the steam upon the fruit will be to cleanse it, while the fruit by absorption of a portion of the moisture conveyed or imparted to it by the steam will be expanded. The duration of exposure of the fruit to the influence of the steam must be determined by the condition of the former; but care should be exercised that the fruit be not cooked.

As in the operation of our device the liquid F is caused to be evaporated into steam, it is desirable that when the base $a'$ and cover $a^2$ of the receptacle A are properly assembled a portion of the abutting end of one of said members shall overlap a portion of the abutting end of the other of said members, suitable stop means being provided to prevent a too great overlapping of the parts referred to. For example, (see Figs. 1 and 2,) $c^3$ is a rib or stop member adapted to prevent the edge $c^4$ of the cover $c^2$ from too greatly overlapping the edge $c^5$ of the base $c'$. It is desirable, too, for purposes of convenience in transporting the device and because, when the device is in operation, of the steam-pressure within the receptacle that suitable means shall be provided whereby the base $c'$ and cover $c^2$ thereof may be firmly but removably secured to each other. Any suitable means may be employed to accomplish this result—as, for example, the hooks G and the eyes or loops $g$, adapted to engage or to be engaged by said hooks in the well-known or in any suitable manner—or said or other suitable fastening means in conjunction with a hinge or hinges may be employed to properly secure to each other the said parts.

When it is desired to fill or partially fill the cylinder B with fruit or to empty it thereof, the cap $b^4$ in the form of our device shown in Figs. 4 and 5 of the drawings must be removed from the cylinder. Owing to the expansion of the fruit within the cylinder when acted upon by the steam, as described, the cylinder should only be partially filled with the fruit to be treated in such manner as to permit of the fruit being fully expanded. Again, if the cylinder be only partially filled with the fruit to be treated the revolution of the cylinder will cause said fruit to constantly change its position therein in such manner that the pieces will be substantially equally acted upon by the steam.

Instead of employing the steam-deflecting member D of the construction described, the deflecting-plates $d'$ may rest upon independent supporting means attached to or forming a part of the base $c'$ of the receptacle, or said member may be formed of a single piece of metal or other suitable material. In the drawings the cylinder-head $b^4$ is shown as removable from the cylinder. The head $b^2$ may be removable and the head $b^4$ be fixed, or both of said heads may be removable, while either or both of them may be perforated or formed of any suitable foraminated material. Again, both of said heads may be fixed and a suitable filling-hole be provided in the wall of the cylinder B and a slide or door, preferably perforated or foraminated, be employed to close said hole.

It is obvious that the number, size, and form of the various parts of our device may be greatly varied without departing from the principle of the invention.

Having thus described our invention, what we claim as new, and desire to secure by Letters Patent, is—

In a fruit-renovator, the combination of a water-receiving receptacle, a cover thereto, a foraminated cylinder revolubly mounted on said receptacle, a removable cap adapted to close one end of said cylinder and convergently-inclined strips, forming an opening beneath said cylinder for directing thereto steam generated from the water beneath.

HENRY HORNBY.
JOHN W. HORNBY.
BERT HORNBY.

Witnesses:
THOS. H. VAN DEGRIFT,
GEORGE J. HODGE.